May 20, 1924.
A. Y. TUCKER ET AL
1,494,723
SELF STRIPPING MOLD AND METHOD OF MAKING
Filed March 24, 1922   3 Sheets-Sheet 1
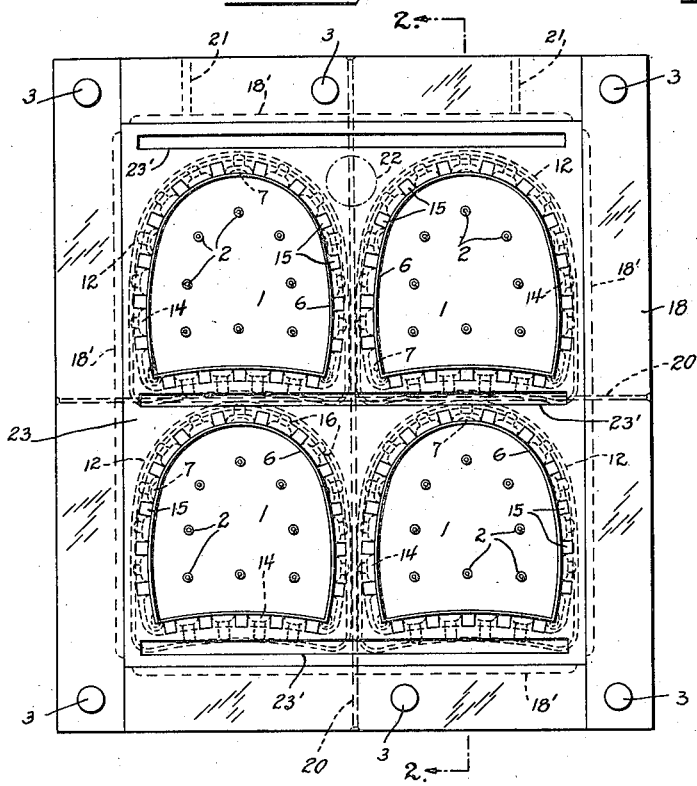
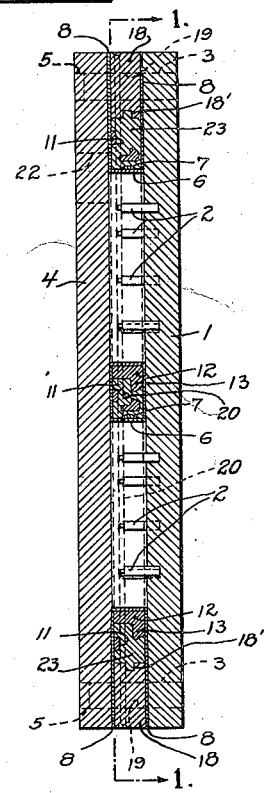
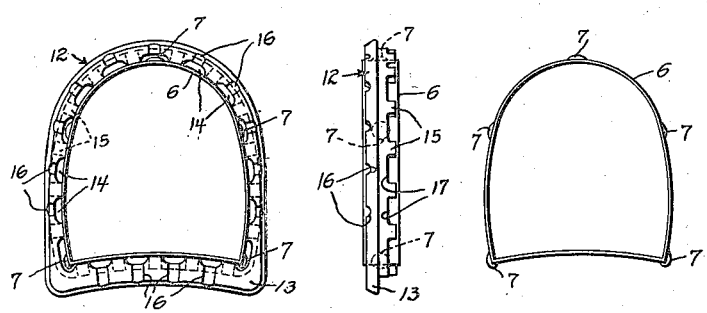
Inventors
ALBERT Y. TUCKER
ISAAC A. WATROUS
By their Attorney
Ernest Hopkinson Inventors
ALBERT Y. TUCKER
ISAAC A. WATROUS
By their Attorney May 20, 1924.
A. Y. TUCKER ET AL
1,494,723
SELF STRIPPING MOLD AND METHOD OF MAKING
Filed March 24, 1922  3 Sheets-Sheet 3
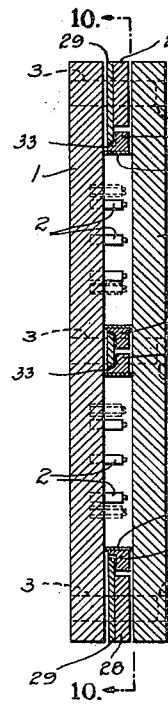
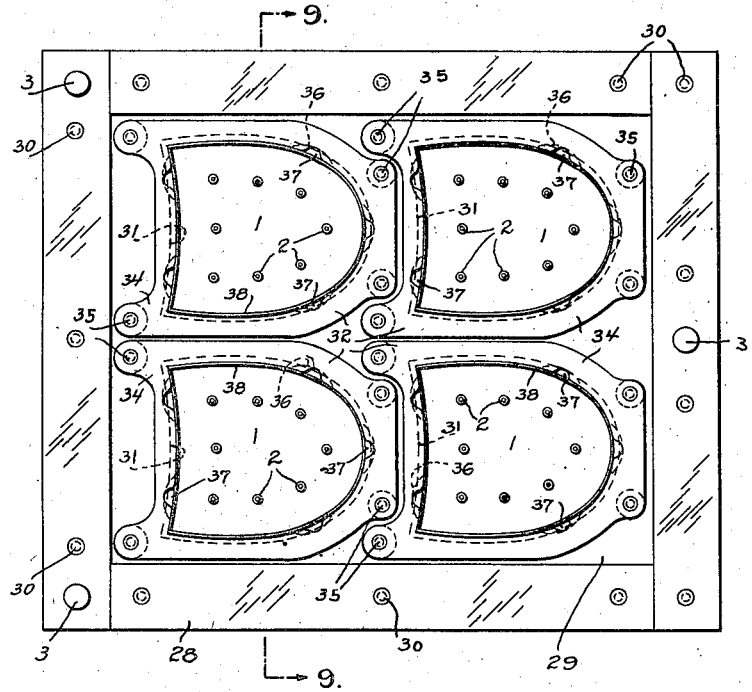
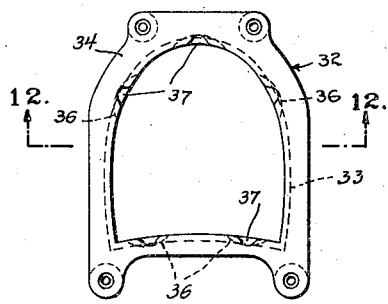
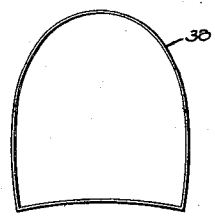
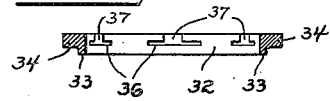
Inventors
ALBERT Y. TUCKER
ISAAC A. WATROUS
By their Attorney
Ernest Hopkinson Patented May 20, 1924.

1,494,723

UNITED STATES PATENT OFFICE.

ALBERT Y. TUCKER, OF MOUNT VERNON, NEW YORK, AND ISAAC A. WATROUS, OF STRATFORD, CONNECTICUT, ASSIGNORS TO REVERE RUBBER COMPANY, A CORPORATION OF RHODE ISLAND.

SELF-STRIPPING MOLD AND METHOD OF MAKING.

Application filed March 24, 1922. Serial No. 546,222.

*To all whom it may concern:*

Be it known that we, ALBERT Y. TUCKER and ISAAC A. WATROUS, both citizens of the United States, and residing at Mount Vernon, in the county of Westchester and State of New York, and Stratford, in the county of Fairfield and State of Connecticut, respectively, have invented a certain new and useful Self-Stripping Mold and Method of Making, of which the following is a full, clear, and exact description.

This invention relates to a self-stripping mold and method of making the same, more particularly to a mold for making articles of vulcanizable material, such as heels.

The ordinary type of heel mold comprises a lower section having the usual washer retaining pins projecting upwardly therefrom, an upper section, and an intermediate section in which are formed the cavities for the heel. The heel blanks placed in the cavities for molding are formed with a certain amount of excess material in order to insure complete filling of the cavity, and in the molding operation this excess material flows over the edge of the cavity forming a sheet of flash or overflow which unites all the heels. Hence, when the molding operation is finished it is necessary to first cut this sheet between the heels in order that the heels may be separated before removing from the cavities, and after removal the individual flash portions must be cut away from each heel. In the molding of small rubber articles an essential feature to economical production is speed and minimum handling in making them. Hence, heels made in the above described manner consume a considerable time in the manufacture. In addition, as the mold cavities in the intermediate section are usually formed in a solid plate, the entire section must be replaced when changing for different styles and sizes of heels, or when worn out.

An object of our invention is to lessen the time, labor and expense required in making molded vulcanized articles.

Another object is to provide a self-stripping mold.

Still another object is to provide a mold in which the parts subject to wear may be readily replaced.

A further object is to provide a gang heel mold in which the mold cavities may be changed as desired for different styles and sizes of heels.

A still further object is to provide a method of making the mold.

For a detailed disclosure of the invention reference is had to the accompanying specification and drawings, in which latter:

Fig. 1 is a plan view of a mold embodying our invention, with the top mold section removed;

Fig. 2 is a section corresponding to the line 2—2 of Fig. 1 with the top section in place, and showing the mold at the completion of the pouring operation;

Fig. 3 is a plan view of a mold cavity liner and a rigid backing therefor;

Fig. 4 is a side elevation of the same;

Fig. 5 is a plan view of the liner;

Fig. 9 is a section corresponding to the line 9—9 of Fig. 10, showing a modified form of mold;

Fig. 10 is a view on the line 10—10 of Fig. 9 with the top mold section removed;

Fig. 11 is a plan of the rigid backing employed in the form shown in Figs. 9 and 10;

Fig. 12 is a section on the line 12—12 of Fig. 11; and

Fig. 13 is a plan of the liner employed with this form of backing.

Figure 6:
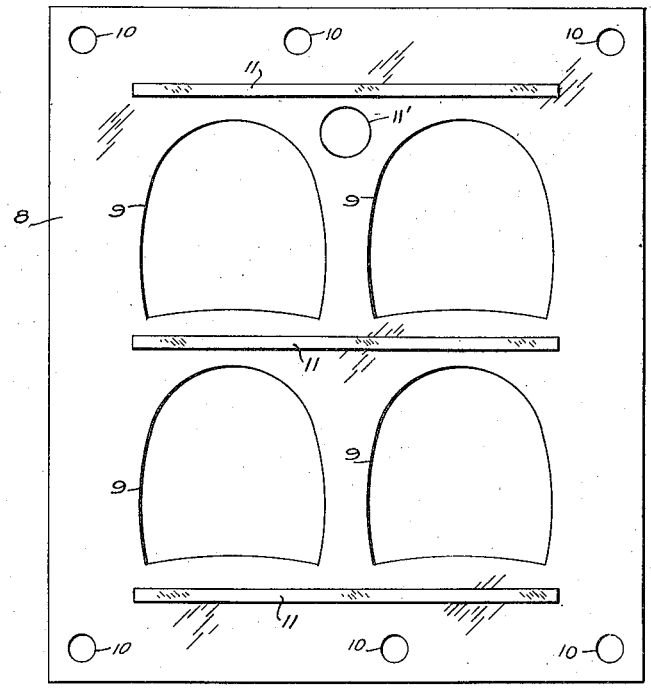
Fig. 6 is a plan view of a liner positioning sheet and material retaining wall used in making the mold.

Referring to Figs. 1 to 5, the numeral 1 designates a bottom mold section of usual form having series of heel washer positioning pins 2 disposed thereon, the section also being provided with dowel pins 3. An upper mold section 4, also of the usual form, is provided, which section is formed with openings 5 for the dowel pins 3. There are also provided a series of thin sheet metal mold cavity liners 6, on which a series of spots 7 of brazing metal may be formed for a purpose to be later described. These liners may be made by bending strips of sheet metal of the proper width into heel shape and joining their ends by welding or brazing, or they may be made by dieing them out from sheet metal, the latter method being preferred. In either case the liners are given a heat treatment, and the edges ground to insure their being in parallelism and the proper distance apart. One of the liners 6 is disposed around each series of washer positioning pins 2, and in order to quickly and accurately position them heels may be placed on the pins 2 and the liners slid over the heels. A thin imperforate sheet 8 (Fig. 6) of any suitable material, such as cardboard, is then placed over the liners, the top mold section applied, and the mold placed in a press. Under the heavy pressure in the press the liners cut a series of heel shaped openings 9 in the sheet, as shown in Fig. 6, and the dowel pins 3 form a series of openings 10. This operation is then repeated to provide a second sheet 8 with the openings 9, and to this second sheet narrow strips 11 of cardboard may be secured between rows of openings, as shown in Fig. 6, which strips are adapted to form flash cavities in a manner to be later described. The second sheet is also provided with a pour hole 11'.

The first perforated sheet 8 is then disposed on the lower mold section, being properly positioned thereon by the dowel pins 3, registering with the openings 10 in the sheet. A liner 6 is then placed in each of the openings 9, and around each liner is disposed a rigid and relatively infusible backing 12. These backings 12 are of substantially heel shape and provided with an interior opening large enough to readily slip over the liner 6. The backings may be made of any suitable material, and we have found that satisfactory results are obtained by casting them of malleable iron. Each backing is provided with an overhanging flange 13 extending around the same, and on its inner wall is provided with a series of regularly spaced recesses 14, leaving between the recesses projections 15 which are adapted to cooperate with the liner 6 in the molding operation to back up the same and prevent its collapse. These projections 15 need not, however, accurately fit or be in contact with the liners 6 for a reason to be later explained. The backing is also provided on one side with recesses 16 extending outwardly through the flange 13, and on the other side with a series of recesses 17. After disposing a backing 12 around each liner a frame 18 is disposed on the sheet 8 around the whole, the frame having formed on its inner wall grooves 18' for a purpose to be later explained, and also having openings 19 for the reception of the dowel pins 3. Brace rods or wires 20 are secured in opposite sides of the frame and extend across the latter at right angles to each other between adjacent liners and backings. One side of the frame is also provided with vent openings 21. The second liner positioning sheet 8 is then disposed over the frame with its openings 10 in registry with the dowel pins 3, its strips 11 turned inwardly, and the openings 9 disposed around the upper edges of the liners 6, as shown in Fig. 2. It will be noted that the backings 12 are made of a height or thickness less than the height of the liners 6 by double the thickness of a sheet 8, so that the spaced sheets 8 not only accurately position and space each liner in the mold, but they also accurately position the backing 12 so that the liner will project above and below it to the required distance. The top mold section is then clamped in position, this section being temporarily provided with a pour hole 22, in registry with the opening 11' in the sheet 8. Any suitable pouring funnel may be secured in the opening 22, the mold turned on edge, and fusible material 23, such as any suitable low melting point alloy, is poured into the opening 22 completely filling all cavities outside of the liners 6 between the two sheets 8, the openings 21 acting as vents during this operation. The perforated sheets 8 not only have a liner spacing and positioning function, as before described, but also act as retaining walls for the fusible material during the pouring of the material in the mold making operation. This backing material completely fills in the recesses 18' in the frame, the spaces in the recesses 14, 16 and 17, and also fills in the space or spaces where any of the projections 15 are not in contact with the liners 6. The fusible material 23 therefore not only acts as a backing for the liner, but it also securely anchors the latter to the backing 12, and both of them to the frame 18. The brazed spots 7 on the liner 6 aid in securing the latter in position. The cardboard sheets 8 are then removed, the pour hole 22 plugged up, and the mold is ready for use, the strips 11 on the upper one of the sheets 8 having formed the flash cavities 23' in the fusible backing 23.

Figure 7:
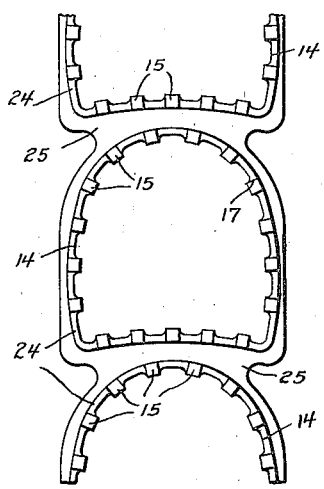
Fig. 7 is a plan view of a rigid liner backing slightly modified from that shown in Fig. 3.

The backings 12 may be cast separately, as shown in Figs. 1 to 4, but in order to save material, time and labor it is preferred to cast a number of them together, and in Fig. 7 one embodiment of this idea is illustrated. In this form the body portion 24 around each liner receiving opening is identical with the backing 12, but the flange portions 25 are cast integral, thereby forming a single row of liner backings, which row may be made of any desired length in accordance with the width of mold to be used. An important advantage of this construction is that the liners may be spaced somewhat more closely together, thereby increasing the capacity of the mold, and one of the series of brace rods 20 is also dispensed with.

Figure 8:
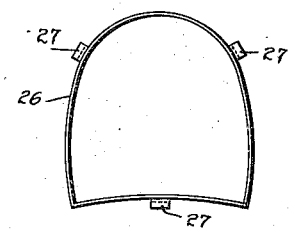
Fig. 8 is a plan view of a modified form of liner.

If a fusible backing 23 of sufficiently high melting point and rigidity be employed the rigid and relatively infusible backings 12 may be dispensed with. In this case liners 26, as shown in Fig. 8, may be employed. These liners are identical with the form shown in Fig 5, but are provided with attaching ears 27 to more securely anchor them in the fusible backing. However, when using the ordinary low melting point alloys the backing tends to soften under the heat of the heel molding operation, and the great pressure exerted renders the liner 6 liable to buckle, hence we prefer to incorporate some form of rigid and relatively infusible backing to assist the fusible material in preventing buckling or collapse of the liners.

In Figs. 9 to 13 another form of the invention is shown, in which the lower and upper mold sections may be of any suitable type, as in Figs. 1 and 2, and the intermediate section is formed by a frame 28 to one side of which a plate 29 is secured, as by the rivets 30, or in any other suitable manner. A series of heel shaped openings 31 are cut in this plate, which openings are of a size somewhat larger than the liner with which they are to be used. A rigid and relatively infusible liner backing 32 is provided for each opening, which has a reduced lower portion 33 adapted to fit within the opening 31, and an overhanging flange portion 34 adapted to rest on the plate 29, to which latter it may be secured in any suitable manner, as by the rivets 35. This backing may be formed in a manner similar to that employed for making the backing 12. Around the inner wall of each backing a series of arc shaped saw kerfs 36 are made, and recesses 37 in the inner wall lead from these kerfs to the upper side of the backing. The liner 38 is similar to the liners shown in Figs. 5 and 8, but is not provided with any securing means, and it is made of a size to exactly fit within the opening in the backing 32. After disposing the liners in their backings they are secured in position by flowing a small amount of brazing metal into the openings 37 and kerfs 36.

In operation, after placing the frame on the lower mold section and disposing a heel blank in the cavity within each liner, the upper mold section is placed in position, and the mold put in the vulcanizing press. Under the influence of the heat and pressure the heel blanks flow, filling the cavities in the liners and finally flowing over the edge of the liners. However, owing to the thin and sharply defined projecting edge of the liner the flash at the point of connection to the heel is reduced to an extremely thin ragged film. After the vulcanizing operation is completed the mold is taken out of the press, the top and bottom sections removed, and the heels knocked out of the liners. During this last operation the sharp projecting edge of the liner severs or tears off the flash at the point immediately adjacent the heel where the flash has been thinned down as above mentioned. It has been found that a projection of the liner of $\frac{1}{32}$ of an inch beyond the backing is sufficient for the purpose, although this distance may be varied within limits. However, it is obvious that if the projection be made too great in length the liner will tend to buckle, owing to lack of any backing to withstand the pressure during the vulcanizing operation. It has also been found that if the thickness of the liner be reduced to too great an extent it will tend to buckle under the pressure, while if the thickness is made too great it will fail to cause the thin film of flash around the heel. It has been found that by making the liner from material of a thickness between 20 and 30 thousandths of an inch these objections are obviated.

It will be seen that in each form of our invention a thin hard liner is provided for the mold cavity, and that this liner is secured in the frame of the mold by a connection of fusible material. Therefore, in each of the forms the liner when worn may be readily replaced by merely heating the mold section sufficiently to melt the fusible connection and replacing the liner by a new one. It will also be seen that in each form of the invention the thin edge of the liner projecting beyond the backing forms a mold which is in effect self stripping. In the forms shown in Figs. 1 to 8 it will also be seen that different sizes and shapes of articles may be molded by merely melting out the replaceable parts of the mold and substituting others suitable for the article to be molded.

By our invention a mold section is provided which fully accomplishes the purpose set forth in the objects, and considerably reduces the time required in the making of molded articles. While in the specific embodiment shown, the invention has been described as applied to the making of heel molds, it is evident that it is not limited in its application, as it may be used for making numerous other molded articles from vulcanizable materials, and that many modifications may be made in the details within the scope of the appended claims.

Having thus described our invention, what we claim and desire to protect by Letters Patent is:

1. A self stripping mold section comprising a relatively thin liner, and a backing therefor of less height than that of the liner adjacent the latter.

2. A self stripping mold section comprising a relatively thin liner, and a readily removable backing therefor of less height than that of the liner adjacent the latter.

3. A self stripping mold section comprising a relatively thin liner, and a readily fusible backing therefor of less height than that of the liner adjacent the latter.

4. A self stripping mold section comprising a relatively thin liner, and a backing therefor terminating slightly short of the bottom and top edges of the liner.

5. A self stripping mold section comprising a relatively thin liner, and a readily removable backing therefor terminating slightly short of the bottom and top edges of the liner.

6. A self stripping mold section comprising a relatively thin liner, and a readily fusible backing therefor terminating slightly short of the bottom and top edges of the liner.

7. A self stripping mold section comprising a relatively thin hard metal liner, a relatively rigid and infusible backing therefor, and fusible means for securing the liner to the backing.

8. A self stripping mold section comprising a relatively thin liner, a relatively infusible backing cooperating with the liner at spaced points, and a fusible backing also cooperating with the liner.

9. A self stripping mold section comprising a relatively thin liner, a rigid and relatively infusible backing cooperating therewith at spaced points, and a fusible backing cooperating with the liner at points intermediate said first points.

10. A self stripping mold section comprising a relatively thin liner, a fusible backing surrounding the same, and a relatively infusible backing for the liner imbedded in said first backing.

11. A self stripping mold section comprising a relatively thin liner, a fusible backing surrounding the same, and a relatively infusible backing for the liner imbedded in said first backing, said backings being of less thickness than the height of the liner.

12. A self stripping mold section comprising a relatively thin liner, a fusible backing surrounding the same, and a relatively infusible backing for the liner imbedded in said first backing, said backings terminating slightly short of the bottom and top edges of the liner.

13. A self stripping mold section comprising a relatively thin liner, a rigid backing therefor, said backing being recessed on its side adjacent the liner and at a plurality of other points, and a fusible backing flowed into said recesses and filling all space between said liner and the rigid backing.

14. A self stripping mold section comprising a thin hard metallic mold cavity liner, a relatively rigid and infusible recessed metal backing surrounding the liner and cooperating therewith at spaced points, and a fusible backing filling the recesses and space between the liner and backing, said backings terminating slightly short of the top and bottom edges of the liner, whereby in molding the flash may be reduced to a thin film adjacent the mold cavity.

15. A self stripping mold section comprising a frame, a relatively thin mold cavity liner disposed therewithin, and fusible means for securing the liner in position.

16. A self stripping mold section comprising a frame, a relatively thin mold cavity liner disposed therein, and a backing of fusible material interposed between the liner and frame and securing the liner in position.

17. A self stripping mold section comprising a frame, a relatively thin mold cavity liner disposed therein, a backing of relatively infusible rigid material cooperating with the liner, and a backing of fusible material also cooperating with the liner and securing the liner and said first backing in position.

18. A self stripping mold section comprising a frame, a relatively thin mold cavity liner disposed therein, a relatively infusible backing surrounding the liner, said backing being recessed on its side adjoining the liner, and a fusible backing within the frame and filling the open spaces between the first backing and liner.

19. A self stripping gang mold section comprising a frame, a series of mold cavity liners disposed therein, and a backing for said liners rigidly connected to the frame, each liner extending above and below the backing.

20. A self stripping gang mold section comprising a frame, a series of mold cavity liners disposed therein, a rigid, relatively infusible backing for each liner, and a fusible connection between each liner and its backing.

21. A self stripping gang mold section comprising a frame, a series of mold cavity liners disposed therein, a fusible backing extending from the liners to the frame, and bracing means extending through the backing between the liners.

22. A self stripping gang mold section comprising a frame, a series of mold cavity liners disposed therein, a rigid and relatively infusible backing for each liner, a fusible backing connecting each liner to its first named backing and to the frame, and bracing means secured to the frame and extending through said fusible backing between adjacent infusible backings.

23. A self stripping gang mold section comprising a relatively infusible and rigid backing, said backing having a plurality of mold cavities therein, a thin hard liner disposed in each cavity, and a fusible backing connecting each liner to the infusible one.

24. A self stripping gang mold section comprising a relatively infusible and rigid backing, said backing having a plurality of mold cavities therein, a thin hard liner disposed in each cavity, said liners having their bottom and top edges extending in the same horizontal planes and slightly beyond the backing, and a fusible backing connecting said liners and first backing and of substantially the same thickness as the latter.

25. A self stripping gang mold section comprising a frame, a series of relatively infusible backing members disposed therein, each of said members having a series of mold cavities therein, a thin hard liner disposed in each cavity, and a backing of fusible material connecting the liners and backing members to each other and to the frame.

26. A gang heel mold including upper, lower and intermediate sections, said intermediate section comprising a frame adapted to be clamped between the other two sections, a series of thin hard mold cavity liners within the frame and having upper and lower edges adapted to engage the corresponding mold sections, a relatively infusible backing for each liner, and a fusible backing for each liner connecting the liners, infusible backing and frame, said backings being slightly spaced from the top and bottom mold sections whereby in molding the flash may be reduced to a thin film adjacent the mold cavities.

27. The method of making mold sections which comprises forming a mold cavity liner of thin hard metal, disposing spacing and retaining walls around the liner adjacent its ends, flowing a backing of fusible material around the liner within said walls, and removing the walls.

28. The method of making mold sections which comprises forming a mold cavity liner of thin hard metal, disposing spacing and retaining walls around the liner adjacent its ends, interposing between said walls and around the liner a backing of relatively infusible material, flowing a backing of fusible material into the space within the walls around the liner, and removing the walls.

29. The method of making intermediate mold sections for three part gang molds which consists in providing two liner positioning walls having corresponding liner openings, disposing said walls in spaced relation with a mold cavity liner in each pair of corresponding openings, flowing a backing of fusible material around the liners between said walls, and removing the latter.

30. The method of making mold sections which comprises forming a mold cavity liner of thin hard metal, disposing a backing of rigid and relatively infusible material around the liner, and securing the liner to said backing by a fusible material.

31. The method of making intermediate mold sections which comprises disposing a thin hard mold cavity liner and a frame between upper and lower mold sections, with spacing elements surrounding the liner and interposed between said frame and the upper and lower mold sections, and filling the space between said elements, the liner and the frame with a fusible backing.

32. The method of making intermediate mold sections for three part gang molds which consists in disposing on one outer section a perforated liner positioning wall, disposing a thin mold cavity liner in each perforation and a frame around the liners, superposing a second perforated liner positioning wall on the frame with the liners projecting into its perforations, clamping the other outer mold section over said last named wall, and flowing a backing of fusible material around the liners between said walls.

33. The method of making intermediate mold sections for three part gang molds which consists in disposing on one outer section a perforated liner positioning wall, disposing a thin mold cavity liner in each perforation, placing a relatively infusible backing on the wall around each liner and a frame around the whole, superposing a second perforated liner positioning wall on said backings and frame with the liners projecting into the perforations, clamping the other outer mold section over said last named wall, and flowing a backing of fusible material into the space around said liners between said walls.

Signed at New York, in the county of New York and State of New York, this 14th day of March, 1922.

ALBERT Y. TUCKER.

Signed at Bridgeport, in the county of Fairfield and State of Conn., this 7th day of March, 1922.

ISAAC A. WATROUS.